United States Patent [19]

Mallo et al.

[11] Patent Number: 6,107,398
[45] Date of Patent: Aug. 22, 2000

[54] ASSOCIATIVE POLYMERS CONTAINING 2,4,6-TRIPHENETHYL BENZYL POLY (ETHOXY)(METH)ACRYLATE AS A MONOMER AND THEIR PROCESS OF PREPARATION BY INVERSE EMULSION POLYMERIZATION

[75] Inventors: Paul Mallo, Chatou; Jean-Marc Corpart, Sannois; Christian Collette, Paris; Francoise Candau; Martial Pabon, both of Strasbourg; Joseph Selb, Kienheim, all of France

[73] Assignee: Elf Atochem S.A., France

[21] Appl. No.: 09/130,654

[22] Filed: Aug. 7, 1998

[30] Foreign Application Priority Data

Aug. 14, 1997 [FR] France ............................ 97 10379

[51] Int. Cl.$^7$ .................................................... C08L 33/14
[52] U.S. Cl. ............................................ 524/832; 524/841
[58] Field of Search .................................. 524/831, 832, 524/833, 841

[56] References Cited

U.S. PATENT DOCUMENTS

| | | | |
|---|---|---|---|
| 3,770,684 | 11/1973 | Singer et al. ........................... | 260/29.7 |
| 4,079,028 | 3/1978 | Emmons et al. ....................... | 260/29.6 |
| 4,155,892 | 5/1979 | Emmons et al. ....................... | 260/29.2 |
| 4,677,152 | 6/1987 | Allen et al. ............................. | 524/543 |
| 4,702,844 | 10/1987 | Flesher et al. ......................... | 210/733 |
| 4,745,154 | 5/1988 | Ruffner ................................... | 524/801 |
| 4,892,916 | 1/1990 | Hawe et al. . | |
| 4,918,123 | 4/1990 | Yang et al. ............................. | 524/110 |
| 4,940,763 | 7/1990 | Flesher et al. ......................... | 526/307 |
| 4,980,434 | 12/1990 | Farrar et al. ........................... | 526/240 |

FOREIGN PATENT DOCUMENTS

| | | |
|---|---|---|
| 0 172 015 A2 | 2/1986 | European Pat. Off. . |
| 0 172 724 A2 | 2/1986 | European Pat. Off. . |
| 0172724 | 2/1986 | European Pat. Off. . |
| 0705852 | 9/1995 | European Pat. Off. . |
| 0 705 852 A1 | 4/1996 | European Pat. Off. . |
| 0 705 854 A1 | 10/1996 | European Pat. Off. . |
| 3-93802 | 4/1991 | Japan . |

OTHER PUBLICATIONS

Fred Robinson, Alkali Soluble Associative Thickeners With a Tristyryl Phenol Hydrophobe, 1995, pp. 205–212 (previously cited).
French Search Report (Mar. 27, 1998).
*Chemical Abstracts,* vol. 115 (1991) pp. 160030 (Corresponds to Japan 3–93802).
*Encyclopedia of Polymer Science and Engineering,* vol. 17, pp. 772–779.

*Primary Examiner*—David W. Wu
*Assistant Examiner*—Kelechi Egwim

[57] ABSTRACT

Novel associative acrylic polymers prepared by radical inverse emulsion polymerization. It is a methacrylic ester in which the radical is composed of a hydrophilic segment and of a hydrophobic segment. The associative polymers of the invention can be used as thickeners, flocculating agents or filler-retaining agents.

11 Claims, No Drawings

9,107,398

ASSOCIATIVE POLYMERS CONTAINING 2, 4,6-TRIPHENETHYL BENZYL POLY (ETHOXY)(METH)ACRYLATE AS A MONOMER AND THEIR PROCESS OF PREPARATION BY INVERSE EMULSION POLYMERIZATION

FIELD OF THE INVENTION

The present invention relates to novel associative polymers intended to increase the viscosity of aqueous solutions, to their process of synthesis and to the aqueous solutions containing these polymers.

BACKGROUND OF THE INVENTION

Viscosifying water-soluble polymers are used in various fields, such as paints, glues and adhesives, the building industry, the textile industry and the paper industry.

The aqueous and/or pigmented compositions with which a person skilled in the art is often concerned, for example aqueous paints, are composed of a liquid phase, which can be water or a mixture of water with a water-miscible organic solvent, of a polymer dispersed in the liquid phase, commonly known as "binder", of fillers and/or pigments, of an agent for dispersing fillers and/or pigments, which can be a water-soluble polymer, and of various adjuvants, such as coalescence agents, biocides, foam-suppressants or others, and finally of one or more viscosifying (or thickening) agents which are natural or synthetic polymers.

Polymers generally increase the viscosity of the solutions in which they are dissolved. The water-soluble polymers generally used as viscosifying agents for aqueous solutions have varied structures; mention may be made of polyacrylamides, optionally partially hydrolysed, of poly (sodium (meth)acrylate)s and their copolymers, of cellulose derivatives, of poly(ethylene oxide)s or alternatively of polysaccharides.

However, the use of conventional water-soluble polymers remains limited. This is because, in order to have good viscosifying properties, the water-soluble polymer must have a high molecular mass. However, the majority of the industrial applications cited above require subjecting the aqueous solution containing the viscosifying polymer to a high shear gradient. This often causes the polymer to degrade, leading to a reduction in its molecular mass and a decrease in its viscosifying power.

Low-mass polymers are certainly less sensitive to mechanical stresses but they have to be used at high concentrations, which is generally incompatible with industrial applications.

Natural polymers, such as cellulose derivatives, are, for their part, sensitive to microbial attacks and require the addition of antimicrobial agents.

In order to improve the performance of water-soluble polymers, associative polymers, which, according to the definition given of them in the Encyclopedia of Polymer Science and Engineering, 2nd Edition, 17, 772–779, are water-soluble polymers containing non-polar groups which gather together in aggregates in polar media, have been developed. They are composed of a skeleton containing predominantly units with a hydrophilic nature and, to a minor extent, hydrophobic sequences. When such structures are dissolved in aqueous solutions, their hydrophobic centres gather together in order to limit the water/hydrophobic sequence interactions. The formation of such physical crosslinking nodes can result in the creation of a true network. The physical gel thus formed considerably increases the viscosity of the water. In the case of an aqueous composition containing fillers and/or pigments, the associative polymers also act by the creation of various bonds between themselves and certain constituents of the compositions. They then contribute, to the compositions containing fillers and/or pigments to which they are added, a theological behaviour which is less pseudoplastic and which thus facilitates the applications.

Associative polyurethane thickeners and associative acrylic thickeners are particularly well known among associative polymers.

Associative polyurethane agents are copolymers with an essentially triblock structure, that is to say molecules composed of three distinct parts, the polymerized hydrophilic central part and two ends, identical or otherwise, composed of hydrophobic groups, such as, for example, alkyl, aryl or alkylaryl groups. Such agents are described in numerous patents, such as, for example, U.S. Pat. Nos. 3,770,684, 4,079,028 and U.S. Pat. No. 4,155,892.

Associative acrylic agents have a different structure based on a main chain with a hydrophilic nature, along which pendant hydrophobic units are randomly distributed. They are most often obtained by emulsion polymerization in water.

Associative polyacrylics only develop their thickening or viscosifying power in alkaline medium. Moreover, on account of their condition of synthesis, they do not exhibit rheological properties with a threshold effect because their molecular mass is not high enough. Inverse emulsion polymerization is a method of choice well known to a person skilled in the art for obtaining acrylic polymers of high molecular mass since it combines a high reaction rate with the achievement of high molecular masses of greater than 1 million. Inverse emulsion polymerization is today widely employed industrially.

It has also been used, but much less often, for the synthesis of associative acrylic (co)polymers. Mention may be made, as example, of U.S. Pat. No. 4,921,903 which teaches the art of synthesizing associative terpolymers by inverse emulsion polymerization but in two stages. In practice, the hydrophobic group is incorporated by transamidation of a hydrophilic copolymer containing amide monomer units.

U.S. Pat. No. 4,918,123 teaches the way of introducing octylacrylamide as hydrophobic monomer in a water/oil emulsion containing units derived from a non-ionic monomer, such as acrylamide, and from a cationic monomer, such as 3-methacrylamidopropyltrimethylammonium chloride. This incorporation is carried out using a third, alcohol, solvent and by using a polymerization inhibitor which is soluble in the oil phase, in order to prevent any polymerization of the hydrophobic monomer in the oil phase. The use of an alcohol is very often undesirable in the final application.

As may be observed on reading the prior art, it is not easy to produce an associative acrylic polymer of high molecular mass by the inverse emulsion polymerization technique. The processes described are of little industrial applicability, require the use of a cosolvent additive, the presence of which is sometimes troublesome to the final user, or require the preparation of specific surfactants intended solely for this use (EP 172,015 and EP 172,724), which consequently increases the cost of this type of product. Moreover, on account of the difficulty in optimizing the final stability and its aptitude for inversion, it is a very complex business to modify the polymerization parameters in order to adapt them to novel requirements as regards final properties of the polymer.

All this is in addition to the conventional disadvantages of inverse emulsions, that is to say the lack of stability over time and the broad particle size distribution.

DESCRIPTION OF THE INVENTION

It has now been found that the abovementioned problems, such as the non-stability of the emulsion or the use of a solvent, can be solved by the inverse emulsion polymerization technique.

Applicant has found and developed novel associative acrylic polymers synthesized by inverse emulsion polymerization, the production of which does not require either the use of cosolvent or the synthesis of specific surfactant.

The compositions comprising the associative polymers of the invention can be used as flocculant and/or filler-retaining agent.

These polymers are composed of hydrophilic polymer skeletons in which a specific (meth)acrylic monomer has been incorporated. The latter is an ester of a (meth)acrylic acid, the radical of which is composed of a hydrophilic part and of a hydrophobic part. The hydrophilic part facilitates the introduction of the monomer into the aqueous phase and consequently the incorporation of the monomer in the polymer, the hydrophobic part contributes the quality necessary for the application as associative polymer.

The special acrylic monomers according to the invention correspond to the following general formula

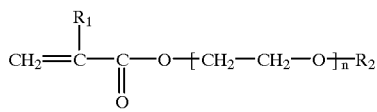

in which
$R_1$=H or $CH_3$
n is an integer of between 2 and 50 and preferably between 8 and 18
$R_2$ is 2,4,6 triphenethyl benzene.

The preferred special monomer of the invention is the polyoxyethylene 2,4,6 triphenethyl benzene methacrylate ethoxylated with 12 mol of ethylene oxide (n=12).

According to a first form, the invention consists in describing associative polymers obtained in inverse latex form by inverse emulsion polymerization. Another form of the invention is the process for the synthesis of these associative acrylic polymers.

The associative acrylic polymers according to the invention are preferably polymers composed of one or more neutral ethylenic monomer(s), of one or more anionic monomer(s), of the polyoxyethylene 2,4,6 triphenethyl benzene methacrylate and optionally of a polyvinyl monomer.

It is also possible to incorporate cationic monomers.

The associative acrylic polymers of the invention are dispersed in the form of particles with a diameter of less than 500 nm. They contain:
from 95 to 99.95 mol % of units derived from at least one monomer chosen from the group consisting of neutral, anionic and/or cationic ethylenic monomers,
from 0.05 to 5 mol % of units derived from at least one acrylic monomer containing a tristyrylphenol radical, and
from 0 to 0.2 mol % of units derived from at least one polyunsaturated monomer.

According to an advantageous form, the associative polymers contain from 0.05 molar % to 5 molar % of polyoxyethylene 2,4,6 triphenethyl benzene methacrylate.

The non-ionic ethylenic monomers are preferably chosen from acrylamide, methacrylamide, N,N-dialkylacrylamides, N-alkylacrylamides, N-vinylmethacetamide, N-vinylmethylformamide, N-vinylpyrrolidone and their mixtures. Acrylamide is a particularly sound choice.

The anionic monomers are preferably chosen from acrylic acid, methacrylic acid, 2-acrylamido-2-methylpropanesulphonic acid and their sodium, potassium or ammonium salts.

The cationic monomers are preferably chosen from the cationic esters of (meth)acrylic acid, such as dimethylaminoethyl (meth)acrylate, dimethylaminopropyl (meth)acrylate, diethylaminoethyl (meth)acrylate, diethylaminopropyl (meth)acrylate, the salts of these esters and their quaternary ammonium derivatives. A typical example of these monomers is acryloyloxy-ethyltrimethylammonium choride, manufactured and sold by Atochem under the reference Adamquat MC.

It is also possible to choose cationic derivatives of acrylamide and of methacrylamide. Mention may be made thereof of dimethylaminoethyl-acrylamide and its salts or dimethylaminoethylmeth-acrylamide and its salts.

A polyunsaturated monomer can be added if it is desired to obtain a crosslinked associative acrylic polymer. Such a monomer can be a diacrylamide derivative, such as methylenebisacrylamide, a diacrylate, such as ethylene glycol diacrylate, or a diallyl compound, such as diallylacetic acid or diallyl phthalate.

The process for the preparation of the inverse latices of the invention is defined generally by the following stages:
a) an emulsion of water-in-oil type is prepared by very vigorously mixing:
an aqueous solution comprising the monomers to be polymerized with an oily phase comprising at least one hydrocarbon-comprising liquid and one surfactant, the hydrophile-lipophile balance (HLB) of which is from 3 to 10 (in the case of a mixture of surfactants, it is the resulting HLB). Mention may be made, as surfactant, of, for example, sorbitan monooleate, sorbitan sesquioleate or their mixtures, as well as the mixture sold by ICI under the reference Hypermer 1083,
b) the inverse emulsion obtained is subjected to polymerization conditions until polymerization is complete and the stable inverse latex has been obtained.

In the inverse emulsion formulations leading to the inverse latex of the invention, the aqueous phase comprising the monomers described above is characterized by a total content of monomers of between 20 and 60% and more particularly between 30% and 50% by weight.

The organic phase can consist of a hydrocarbon or of a mixture of hydrocarbons. Among them, isoparaffinic hydrocarbons or mixtures of isoparaffinic hydrocarbons are best suited. Isopar M, sold by the company Exxon, is a good example. It is also possible to use mixtures of paraffinic, isoparaffinic and naphthenic hydrocarbons.

The ratio by weight of the amount of aqueous phase to the amount of organic phase is from 0.5 to 3 and preferably from 0.8 to 1.2.

The polymerization can be carried out isothermally or quasiadiabatically.

The initiators can be, for example, azobisisobutyronitrile or 2,2'-cyanopentavaleric acid, if it is decided to carry out the polymerization isothermally, or chosen from the following redox couples: persulfate/metabisulfite, hydrogen peroxide/ascorbic acid, persulfate/ascorbic acid or organic hydroperoxides/sodium metabisulfite.

EXAMPLE NO. 1

72.76 g of sorbitan sesquioleate are dispersed with stirring in 227.2 g of Isopar M (organic phase).

At the same time as this operation, the following aqueous phase is prepared, with stirring, by successively adding:

250 g of doubly deionized water
103.6 g of glacial acrylic acid
97.8 g of a 50% aqueous sodium hydroxide solution (this addition is carried out so as not to excessively raise the polymerization temperature)
124.9 g of acrylamide
0.75 g of a 40% aqueous sodium diethylenetriaminepentaacetate solution
0.049 g of methylenebisacrylamide
6.8 g of polyoxyethylene 2,4,6 triphenethyl benzene methacrylate ethoxylated with 12 mol of ethylene oxide
doubly deionized water, so as to bring the total mass of aqueous phase to 670 g.

The two phases are then vigorously mixed using a device of Utra-turrax type until an emulsion is obtained with a Brookfield viscosity (rotor 4, v=20) of 2600 mPa.s. The emulsion is then placed in a polymerization reactor equipped with a stirrer, a system for introducing gaseous nitrogen and a device allowing the introduction of reactants.

The emulsion is then deoxygenated and cooled to approximately 10° C.

0.05 g of cumene hydroperoxide is then introduced into the polymerizer
0.03 g of sodium bisulfite, dissolved in 20 g of water, is then slowly introduced into the polymerizer.

The reaction begins and the temperature is allowed to rise.

At the end of polymerization, a stable inverse latex is obtained.

Characteristics 19.07 g of latex are dispersed in 480.93 g of doubly deionized water containing 2 g of nonylphenol ethoxylated with 10 mol of ethylene oxide. The combined mixture is left stirring for 60 minutes.

The viscosity obtained is 75,000 mPa.s (Brookfield, rotor 6, v=20). 7 ml of a 70 g/l sodium chloride solution are then added and the mixture is left stirring for 20 minutes. A viscosity of 15,000 mPa.s is then obtained.

A further 7 ml of the 70 g/l sodium chloride solution are added to the beaker as above. After 10 minutes, a value of 4800 mPa.s is obtained for the Brookfield viscosity (rotor 6, v=20).

Comparative Example No. 1

The same test is repeated but without incorporating the polyoxyethylene 2,4,6 triphenethyl benzene methacrylate. As for the rest, the preparation is carried out in exactly the same way.

The product obtained has the following characteristics:
viscosity in doubly deionized water: 28,000 mPa.s
viscosity after 1st addition of 7 ml: 9000 mPa.s
viscosity after 2nd addition of 7 ml: 3300 mPa.s

EXAMPLE NO. 2

The preparation is carried out as in Example No. 1 but the 72.76 g of sorbitan sesquioleate are replaced by 50 g of Hypermer 1083 (sold by ICI).

Furthermore, 11.2 g of polyoxyethylene 2,4,6 triphenethyl benzene methacrylate ethoxylated with 12 mol of ethylene oxide (n=12) are used instead of 6.8 g.

A product having the following characteristics is obtained:

viscosity at 1% of polymer in doubly deionized water: 61,800 mPa.s
viscosity of the preceding solution after 1st addition of 7 ml of the sodium chloride solution (70 g/l): 11,500 mPa.s
viscosity of the preceding solution after 2nd addition of 7 ml of the sodium chloride solution (70 g/l): 5000 mPa.s

Comparative Example No. 2

The preparation is carried out as in Example No. 2 but oxyethylenated (12 mol) polyoxyethylene 2,4,6 triphenethyl benzene methacrylate is not incorporated.

As for the rest, the preparation is carried out identically.

The product obtained has the following characteristics:
viscosity in doubly deionized water: 24,000 mPa.s
viscosity after st addition of 7 ml: 8200 mPa.s
viscosity after 2nd addition of 7 ml: 2800 mPa.s

EXAMPLE NO. 3

Example No.1 is repeated with the removal therefrom of the methylenebisacrylamide.

The product thus obtained has the following characteristics:
viscosity in doubly deionized water: 38,200 mPa.s
viscosity after 1st addition of 7 ml: 23,250 mPa.s
viscosity after 2nd addition of 7 ml: 16,500 mPa.s

Comparative Example No. 3

The oxyethylenated polyoxyethylene 2,4,6 triphenethyl benzene methacrylate is removed and the preparation is carried out as in Example No. 3.

The product obtained has the following characteristics:
viscosity in doubly deionized water: 4000 mPa.s
viscosity after 1st addition of 7 ml: 2500 mPa.s
viscosity after 2nd addition of 7 ml: 1500 mPa.s Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Associative acrylic polymer in the form of an inverse latex of particles with a diameter of less than 500 nm comprising:

from 95 to 99.95 mol % of units derived from at least one monomer selected from the group consisting of neutral, anionic and/or cationic ethylenic monomers, from 0.05 to 5 mol % of units derived from at least one acrylic monomer containing a 2,4,6 triphenethyl benzene radical, and from 0 to 0.2 mol % of units derived from at least one polyunsaturated monomer.

2. Associative acrylic polymer according to claim 1, wherein the acrylic monomer containing a 2,4,6 triphenethyl benzene radical is selected from the formula:

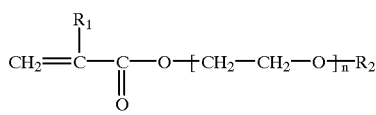

in which $R_1$ represents an H or a $CH_3$ $R_2$ is 2,4,6 triphenethyl benzene n is an integer of between 2 and 50 and.

3. Associative acrylic polymer according to claim 2, wherein the acrylic monomer containing a 2,4,6 triphenethyl benzene radical is polyoxyethylene 2,4,6 triphenethyl benzene methacrylate.

4. Process of the synthesis of the associative acrylic polymer of claim 1 comprising inverse emulsion polymerization of a mixture containing:

from 95 to 99.95 mol % of at least one monomer selected from the group consisting of non-ionic ethylenic monomers, of anionic and/or cationic monomers, from 0.05 to 5 mol % of at least one acrylic monomer containing a 2,4,6 triphenethyl benzene radical, and from 0 to 0.2 mol % of at least one polyunsaturated monomer, in the presence of a surfactant with an HLB of between 3 and 10.

5. Process according to claim 4, wherein the acrylic monomer containing a 2,4,6 triphenethyl benzene radical is selected from the formula:

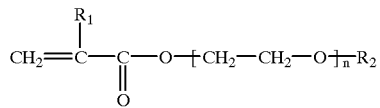

in which $R_1$ represents an H or a $CH_3$ $R_2$ is 2,4,6 triphenethyl benzene n is an integer of between 2 and 50.

6. Process according to claim 5, wherein the acrylic monomer containing a 2,4,6 triphenethyl benzene radical is polyoxyethylene 2,4,6 triphenethyl benzene methacrylate oxyethylenated with 12 mol of ethylene oxide.

7. Process according to claim 4, wherein the monomers to be polymerized represent from 20 to 60% by weight of the solution and the ratio by weight of aqueous phase to organic phase is from 0.5 to 3.

8. Composition for thickening, flocculating and/or filler-retaining comprising the polymers of claim 1.

9. Associative acrylic polymer according to claim 1, wherein n is between 8 and 18.

10. Process of the synthesis of the associative acrylic polymer of claim 4, wherein n is between 8 and 18.

11. Process according to claim 7, wherein the amount of monomers to be polymerized is from 30 to 50% by weight and the ratio by weight of the aqueous phase to the organic phase is from 0.8 to 1.

* * * * *